United States Patent
Ostapovicz et al.

(10) Patent No.: US 8,010,741 B1
(45) Date of Patent: Aug. 30, 2011

(54) METHODS AND APPARATUS FOR CONTROLLING MIGRATION OF CONTENT

(75) Inventors: Scott Ostapovicz, Holliston, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 434 days.

(21) Appl. No.: 12/241,658

(22) Filed: Sep. 30, 2008

(51) Int. Cl.
*G06F 12/00* (2006.01)
*G06F 13/00* (2006.01)
*G06F 13/28* (2006.01)

(52) U.S. Cl. .. 711/108; 711/161; 711/216; 711/E12.002
(58) Field of Classification Search .................. 711/108, 711/161, 216, E12.002
See application file for complete search history.

(56) References Cited

U.S. PATENT DOCUMENTS

| 7,263,521 B2 | 8/2007 | Carpentier et al. | |
| 2007/0050415 A1* | 3/2007 | Armangau et al. | 707/200 |
| 2007/0294310 A1* | 12/2007 | Yagawa | 707/200 |

* cited by examiner

*Primary Examiner* — Edward Dudek, Jr.
(74) *Attorney, Agent, or Firm* — Krishnendu Gupta; Robert Kevin Perkins; Joseph D'Angelo (57) ABSTRACT

Some embodiments relate to a migration policy that controls migration of content from a transactional storage system to a fixed content storage system. In some embodiments, content may be migrated from the transactional storage system to the fixed content storage system based on at least one criteria that relates to whether at least a portion of the content is binding.

20 Claims, 8 Drawing Sheets

Figure 1

Prior Art

METHODS AND APPARATUS FOR CONTROLLING MIGRATION OF CONTENT

TECHNICAL FIELD

The present invention relates to the storage of content in a computer system including a fixed content storage system.

BACKGROUND

Some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

The eXtensible Access Method (XAM) proposal is a proposed standard, that employs content addressable storage techniques, that is being developed jointly by members of the storage industry and provides a specification for storing and accessing content and metadata associated with the content. In accordance with XAM, an "XSet" is a logical object that can be defined to include one or more pieces of content and metadata associated with the content, and the XSet can be accessed using a single object identifier (referred to as an XUID). As used herein, a logical object refers to any logical construct or logical unit of storage, and is not limited to a software object in the context of object-oriented systems.

Figure 1:
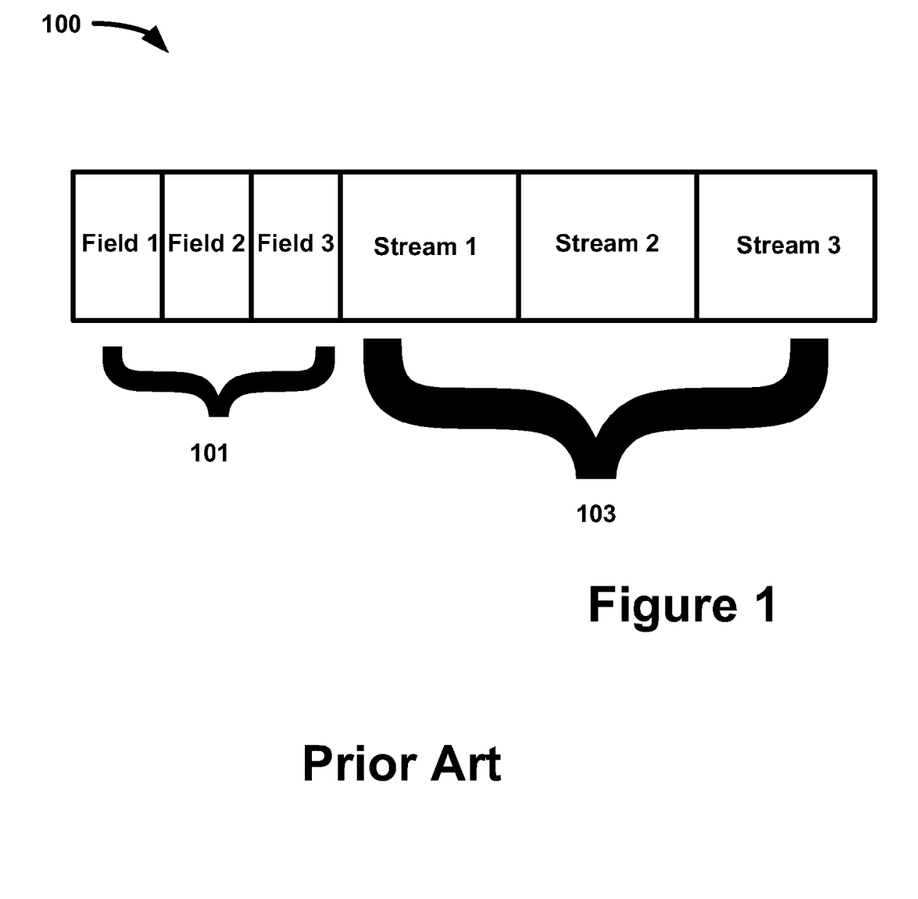
FIG. 1 is a diagram of an illustrative XSet.

As discussed above, an XSet can store one or more pieces of content. For example, an XSet can be created to store a photograph and the photograph itself can be provided as a first "stream" to the XSet. One or more files (e.g., text files) can be created to include metadata relating to the photograph, and the metadata file(s) can be provided to the XSet as one or more additional streams. Once the XSet has been created, a XUID is created for it so that the content (e.g., the photograph) and its associated metadata can thereafter be accessed using the single object identifier (e.g., its XUID). A diagram of an illustrative XSet 100 is shown in FIG. 1. As shown in FIG. 1, XSet 100 includes a number of streams for storing user provided content and metadata. The XSet may also include a number of additional fields 103 that store other types of metadata for the XSet, such as, for example, the creation time for the XSet, the last access time of access of the XSet, and/or any retention period for the XSet.

In XAM, each field or stream in an XSet may be designated as binding or non-binding. Binding fields and streams are used in computing the XUID for the XSet, while non-binding fields and streams are not. That is, the XUID for an XSet is computed based on the content of the binding fields and streams (e.g., by hashing the content of these fields and streams), but not based on the non-binding fields and streams. The designation of certain fields and/or stream as binding may change. Re-designating as binding a field or stream that had been previously designated as non-binding causes the XUID for the XSet to change. Similarly, re-designating a field or stream as non-binding that had previously been designated as binding causes the XUID for the XSet to change.

Because the XUID for an XSet is generated using the content of the binding fields and streams, the binding fields and streams of the XSet cannot be changed once the field becomes binding (though these fields and streams can be re-designated as non-binding and then changed). A request to modify a binding field or stream will result in a new XSet with a different XUID being created.

SUMMARY

One embodiment is directed to a method for use in a computer storage environment comprising a transactional storage system and a fixed content storage system, wherein the storage environment stores a plurality of content units and provides a content addressable interface via which at least some of the plurality of content units are accessible, wherein a content unit accessible via the content addressable interface is accessible via an identifier that comprises a content address generated based, at least in part, on at least a participating portion of the content of the content unit. The method comprises an act of: (A) providing an interface to the storage environment that enables configuration of at least one migration policy that controls migration of sets of data between the transactional storage system and the fixed content storage system, wherein the at least one migration policy evaluates at least one criteria relating to whether a set of data in a content unit is participating in the generation of the content address for the content unit. Another embodiment is directed at least one computer readable medium, encoded with instructions that, when executed performs the above-described method.

Another embodiment is directed to a method for use in a content addressable storage system that stores a plurality of objects and provides a content addressable interface via which at least some of the plurality of objects are accessible, wherein an object accessible via the content addressable interface is accessible via an identifier that comprises a content address generated based, at least in part, on at least a participating portion of the object, the method comprising: (A) in response to an operation that is directed to a first object stored in at least one content unit on the storage system and seeks to modify a non-participating portion of the first object, wherein the first object is accessible via a first content address and comprises a participating portion that participates in generating the first content address and the non-participating portion that does not participate in generating the first content address, performing acts of; (A1) maintaining on the storage system a first version of the first object comprising a first version of the non-participating portion that does not reflect modification by the operation; and (A2) storing on the storage system a second version of the first object comprising a version of the non-participating portion that reflects modification by the operation.

A further embodiment is directed to content addressable storage system comprising: at least one storage device that stores a plurality of objects; a content addressable interface via which at least some of the plurality of objects are accessible, wherein an object accessible via the content addressable interface is accessible via an identifier that comprises a content address generated based, at least in part, on at least a participating portion of the object; and at least one controller that, in response to an operation that is directed to a first object stored in at least one content unit on the storage system and seeks to modify a non-participating portion of the first object, wherein the first object is accessible via a first content address and comprises a participating portion that participates in generating the first content address and the non-participating portion that does not participate in generating the first content address: maintains on the storage system a first version of the first object comprising a first version of the non-participating portion that does not reflect modification by the operation; and stores on the storage system a second version of the first object comprising a version of the non-participating portion that reflects modification by the operation.

BRIEF DESCRIPTION OF THE DRAWINGS

Aspects of the invention are described with reference to illustrative embodiments and the following drawings in which like reference characters represent like elements, and wherein.

DETAILED DESCRIPTION

Some embodiments relate to techniques for storing mutable content (e.g, an XSet with some non-binding stream or fields) on a fixed content archive storage system. A fixed content archive refers herein to a storage system that does not allow content stored thereon to be modified, unless an explicit command to delete the content is received Thus, if a request to modify a content unit stored on a fixed content archive is received, the archive creates a new content unit, rather than overwrite the content of the previous version of the content unit with the modified content. Thus, each time the content unit is modified, a new version of the content unit is created on the archive storage system. If it desired to recover any content from a content unit that was modified, a previous version of the content unit having the desired data may be retrieved.

The examples herein refer to fixed content archive storage systems that are capable of implementing at least some aspects of the XAM standard. However, it should be appreciated that the aspects of the present invention described herein are not limited in this respect and can be used with any fixed content archive storage system.

Applicants have appreciated that, when a logical object is stored on a fixed content archive storage system, some or all of the content of the objects (e.g., fields or streams of an XSet in XAM) may be non-binding, thereby allowing the XSet to be modified after it is stored on the archive storage system. Each time one of these non-binding fields is modified a new version of the object (e.g., the XSet) is created. As a result, if an object (e.g., an XSet) is modified frequently, a large number of versions of the object may be stored on the archive storage system, thereby consuming a large amount of storage space. The problem is compounded when there are a large number of objects with non-binding portions that are being modified frequently.

Applicants have further appreciated that, in many situations, content is modified frequently until it is in a final state, after which it is desired that the content no longer be able to be modified. For example, in may be desired to initially designate one or more streams of an XSet as non-binding as the content of the streams is periodically being modified, but then designate the stream as binding once the content is in a desired final state. Such situations can arise, for example, if a user is editing video content to create a video. The content may be edited frequently until the user has produced the final video, after which the user is done making change so that the content will not thereafter be modified. As another example, a user may be writing and revising drafts of a magazine article or a company's financial statements. Frequent modification of such content may occur as the user revises and updates various drafts, but once the final draft is produced, it may not be modified again. Applicants have appreciated that while fixed content archive storage systems are advantageous for storing content that is fixed (e.g., because they often can do so cost effectively), non-archive transactional storage systems are better suited for storing content that changes frequently. A non-archive transactional storage system is a storage system in which content may be modified by overwriting or deleting a portion of the content, rather than creating a new version to store the modified content.

Thus, Applicants have appreciated that for some objects that transition from a phase in which they are frequently updated to one wherein they are more fixed, it maybe desirable to store the content unit on a transactional storage system when it is being updated frequently and then migrate it to a fixed storage system when the content becomes more fixed.

Thus some embodiments relate to configuring and/or providing a migration policy that controls migration of content between a non-archive transactional storage system (e.g., in which content may be modified) and a fixed content archive storage system based on at least one criteria relating to whether at least some portion of the content is binding (i.e., participates in the generation of the identifier for the content).

As discussed above, other embodiments relate to storing mutable content on a fixed content archive storage system, such that a new version of the content is created when the content is modified. This may be done in any suitable way, as the invention is not limited in this respect.

In some embodiments, the mutable content may be a XAM XSet and may be stored on a content addressable storage (CAS) system. In a CAS system, content units are logical objects used to store content on a CAS system and are identified and accessed using content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address.

When an XSet is stored on a CAS system, the XSet may be represented by one or more content units on the CAS system. This may be done in any suitable way, as the invention is not limited in this respect. In some embodiments, the XSet may be represented on the CAS system using content units referred to herein as content descriptor files (CDFs) and blobs. Content can be stored in a content unit referred to as a blob, which is identified on the CAS system by a content address computed, at least in part, from at least a portion of the content of the blob. Each blob has at least one associated CDF which stores the content address of the blob (i.e., as a pointer to the blob) as well as metadata associated with the blob. The CDF is independently accessible via its own content address. By accessing the CDF, the content in the blob can be efficiently and easily accessed (via its content address that is included in the CDF) along with its associated metadata. In some embodiments, a CDF may have a mutable portion. The mutable portion of the CDF is not used is computing the content address of the CDF. Thus, if the mutable portion changes, the content address of the CDF need not change.

Figure 2:
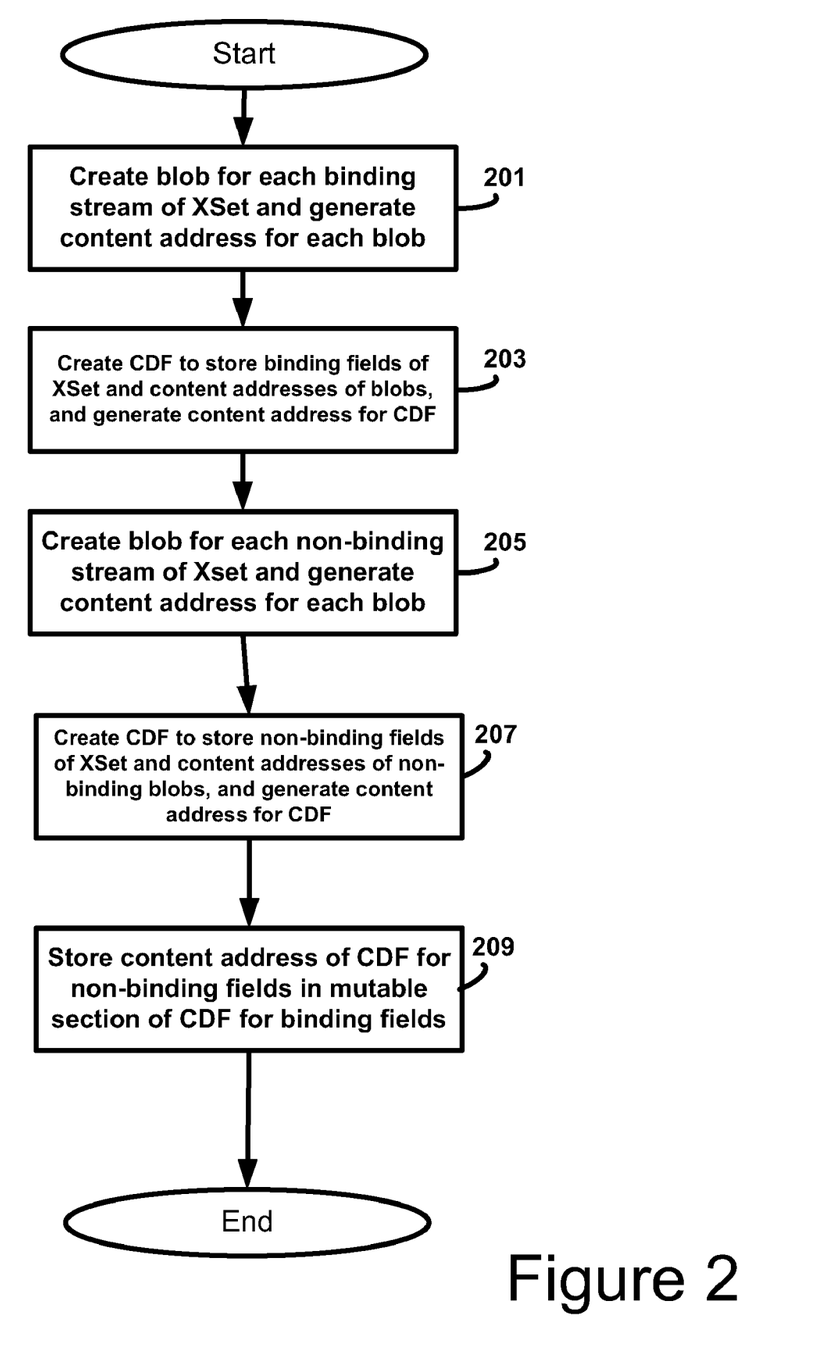
FIG. 2 is a flow chart of an illustrative process for creating content units on a content addressable storage (CAS) system to store an XSet, in accordance with some embodiments.

FIG. 2 shows an illustrative process that may be used in some embodiments, to represent a XAM XSet using blobs and CDFs. The process beings at act 201, where a blob is created for each binding stream of the XSet and a content address for each blob is generated. The process next continues to act 203, where a first CDF is created to store the binding fields of the XSet and a content address for this CDF is generated. The CDF has a non-mutable portion which is used in generating the content address and a mutable portion which is not used in generating the content address. The binding fields of the XSet are stored in the non-mutable portion of the CDF along with the content addresses of each of the blobs created in act 201.

The process next continues to act 205 where a blob is created for each non-binding stream of the XSet and a content address is generated for each blob. The process then continues to act 207, where a second CDF is generated to store the non-binding fields of the XSet and a content address is generated for the second CDF. The second CDF also has a non-mutable portion which is used in generating the content address and a mutable portion which is not used in generating the content address. The binding fields of the XSet are stored in the non-mutable portion of the CDF along with the content addresses of each of the blobs created in act 205. The process next continues to act 209, where the content address of the second CDF is stored in the mutable portion of the first CDF, and the process ends.

Figure 3:
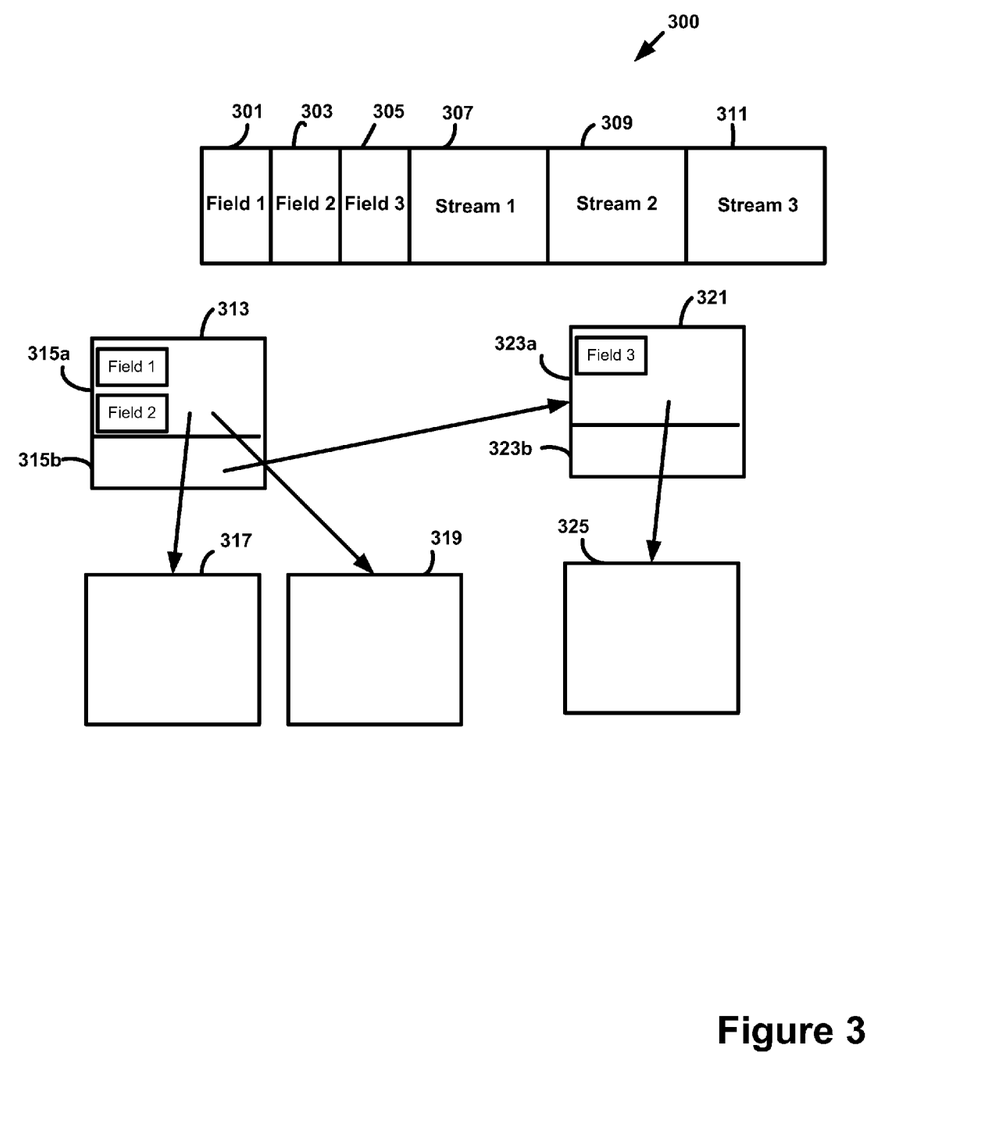
FIG. 3 is a diagram of illustrative content units created on a CAS system to store an XSet, in accordance with some embodiments.

FIG. 3 shows the blobs and CDFs created by storing an XSet 300 on a CAS storage system. As shown in FIG. 3, XSet 300 has three fields (fields 301, 303, and 305) and three streams (streams 307, 309, and 311). In the example of FIG. 3, fields 301 and 303 are binding fields, and field 305 is non-binding. In addition, streams 307 and 309 are binding fields, and stream 311 is non-binding.

CDF 313 has non-mutable portion 315*a* and mutable portion 315*b*. Non-mutable portion 315*a* stores fields 301 and 303 and stores pointers to (e.g., the content addresses of) blobs 317 and 319. Blob 317 stores the content of stream 307 and blob 319 stores the content of stream 309. Mutable portion 315*b* stores a pointer to (e.g., the content address of) CDF 321, which has non-mutable portion 323*a* and mutable portion 323*b*. Non-mutable portion 323*a* stores field 305 of XSet 300 and a pointer (e.g., the content address of) blob 325. Blob 325 stores the content of stream 311.

In some embodiments, the content address for the CDF that stores the binding fields of the XSet may be used in generating the XUID for the XSet. For example, in FIG. 3, the content address of CDF 313 may serve as a basis for the XUID of the XSet 300. That is, this content address is computed from the binding portions of the XSet (i.e., the binding fields and the content addresses of the binding streams) such that by using this content address as all or a portion of the XUID for the XSet the XUID is computed using the binding fields of the XSet. In addition, when the CAS system receives a request to access the XSet that identifies the XSet using its XUID, the CAS system may determine the content address of the CDF from the XUID and use this content address to access the content units that form the XSet.

In accordance with some embodiments, if it is desired to modify any of the non-binding portions of the XSet, new content units may be created on the CAS system to store the modified data, without deleting or modifying the content units that store the older version of the non-binding data. This may be done in any suitable was, as this aspect is not limited to any particular implementation technique.

Figure 4:
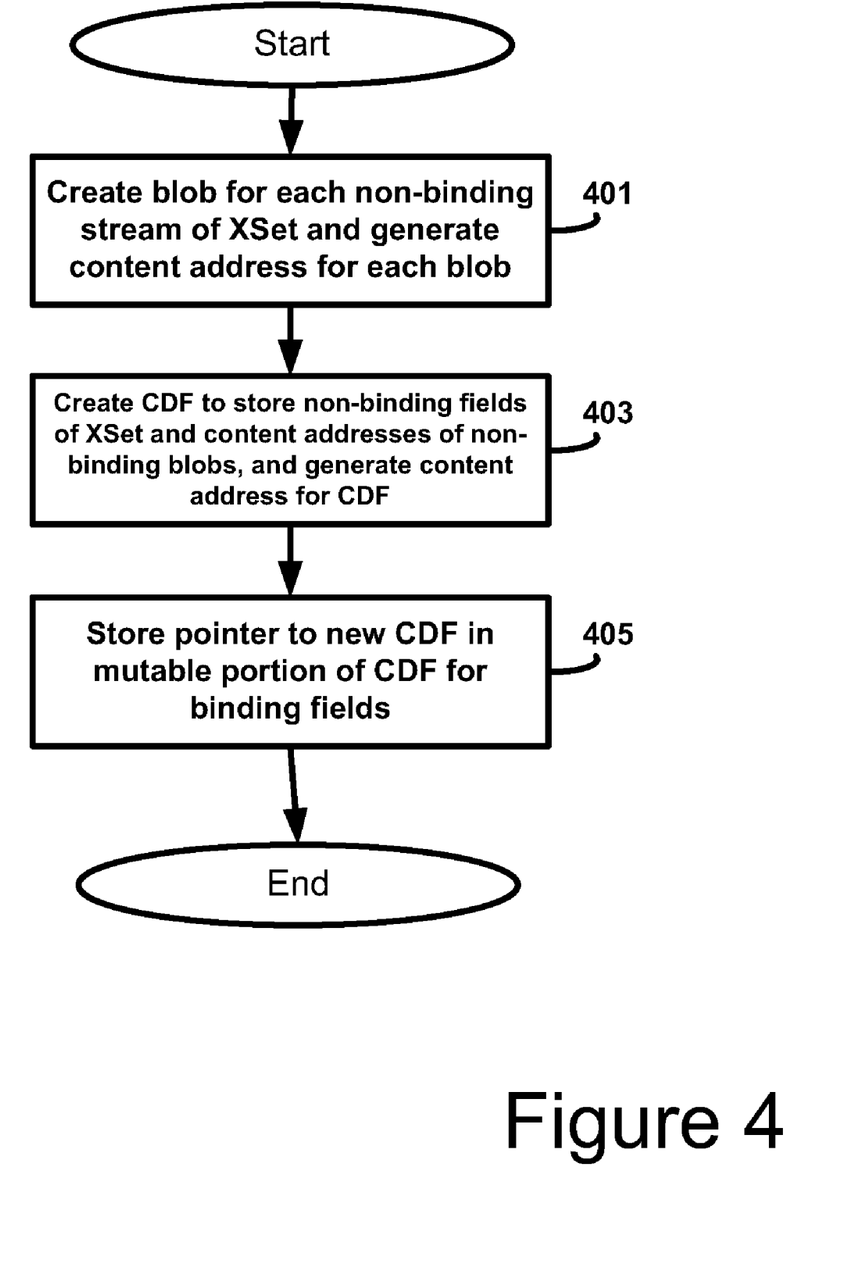
FIG. 4 is a flow of an illustrative process for creating new content units on a CAS for storing modified content of a non-binding portion of an XSet, in accordance with some embodiments.

FIG. 4 shows an illustrative process for use in some embodiments for creating new content units for storing modified content of a non-binding portion of an XSet stored on a CAS system. As shown in FIG. 4, the process begins at act 401, where a new blob is created for each non-binding stream in the XSet, and a content address is computed for each blob. If a non-binding stream of the XSet is being modified, then the corresponding blob stores the modified content. Otherwise, the blob for each non-binding stream simply stores the content of the stream as it is stored in the earlier version. The process next continues to act 403, where a CDF (having a mutable and non-mutable portion) is created to store the non-binding fields of the XSet. The modified content of any fields being modified are stored in the non-mutable portion of the CDF. If a field is not being modified, then its content as stored in the earlier version is stored in the non-mutable portion of the CDF. A pointer to (e.g., the content address of) each blob generated in act 401 is also stored in the non-mutable portion of the CDF, and content address for the CDF is computed from the content of the non-mutable portion of the CDF. The process next continues to act 405, where the mutable section of the CDF that stores the binding fields of the XSet is modified to store a pointer to (e.g., the content address of) the CDF created in act 403, and the process ends.

Figure 5:
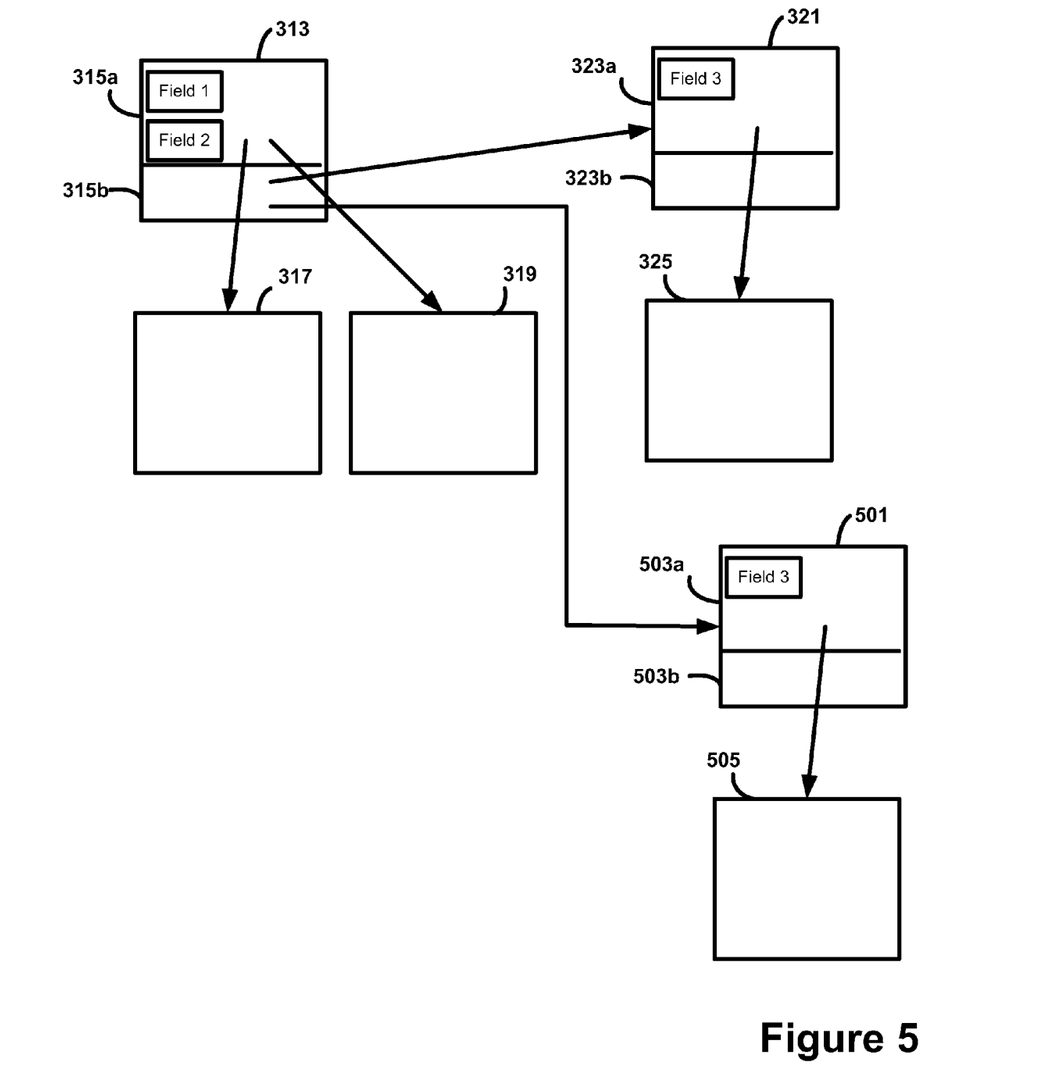
FIG. 5 is a diagram of illustrative content units created on a CAS system for storing modified content of a non-binding portion of an XSet, in accordance with some embodiments.

FIG. 5 shows an example of the blobs and CDFs stored on the CAS system, if stream 311 of XSet 300 is modified. As shown in FIG. 5, all of the content units created in the example of FIG. 3 remain stored on the CAS system, but a new CDF 501 and a new blob 505 are created and stored for the modified XSet. CDF 501 (having non-mutable portion 503*a* and mutable portion 503*b*) stores the content of field 305 of XSet 300. Because, in this example, field 305 is not being modified, the content of field 305 in CDF 501 is the same as the content of the field in CDF 321. Non-mutable portion of CDF 501 stores a pointer to (e.g., the content address of) blob 505, which stores the modified content of stream 311. In addition, the mutable portion of CDF 313 now stores, in addition to a pointer to CDF 321, a pointer to CDF 501. The mutable portion of CDF 313 may also store metadata, associated with each of these pointers, that indicates when each of these CDFs was created. This allows the time of creation of each version of the non-binding content to be determined and facilitates determination of which version of the non-binding content is the latest.

As can be appreciated from the example above, each time the non-binding content is modified one or more new content units are generated to store the modified content and a pointer to the new content unit(s) is stored in the CDF for the binding fields. Thus, each new content unit or set of content unit(s) generated when a modification occurs can be a thought of as a version of the non-binding content of the XSet at a particular point in time. The CDF for the binding portions of the XSet (e.g., CDF 313 in FIGS. 3 and 5) stores a pointer to each version, such that that this CDF may be used to access any version of the non-binding content.

In the example above, a non-binding stream of an XSet is modified and a new content unit (e.g., blob 505) is created to store the modified content. However, in some situations, only a non-binding field of the XSet may be modified, while the non-binding streams of the XSet are not modified. In such situations, a new CDF may be generated to store the content of the non-binding fields (including the modified content for the fields being modified) but a new blob need not be created for each non-binding stream. Rather, because the streams are not being modified, the newly created CDF may simply include pointers to the already existing blobs that store the stream content. Thus, in some embodiments, a new blob is only created for a stream if that stream is being modified, while pointers to the existing blobs for the streams not being modified may be stored in the new CDF, rather than creating new blobs to store the same content. However, the invention is not limited in this respect as, in some embodiments, a new blob may be created for each non-binding stream each time any of the non-binding content of the XSet is modified.

As should be appreciated from the example of FIG. 5, when a new version of an XSet is stored on the storage system, a new copy of all of the content of the XSet need not be created. Rather, a new version of the XSet may share content units with one or more earlier versions of the XSet. For example, in FIG. 5, the first version of the XSet includes content units 313, 317, 319, 321, and 325, whereas the second version of the XSet includes content units 313, 317, 319, 501, and 505.

The examples above are examples for creating versions of non-binding portions of a XAM XSet using CDFs and blobs on a CAS system. However, aspects relating to creating versions of non-binding portions of objects are not limited to use with XAM XSets, as any suitable type of logical objects may be used. In addition, the invention is not limited to use with systems that uses CDFs and/or blobs to store logical objects, as objects may be represented on a system in any suitable way.

In accordance with another embodiment, a migration policy may be employed that controls migration of content stored on a non-archive transactional storage system (e.g., in which content may be modified) to a fixed content archive storage system based on at least one criteria relating to whether at least some portion of the content is binding (i.e., participates in the generation of the identifier for the content). This may be done in any suitable way, as aspects of the invention related to performing such migration are not limited to any particular implementation technique.

Figure 6:
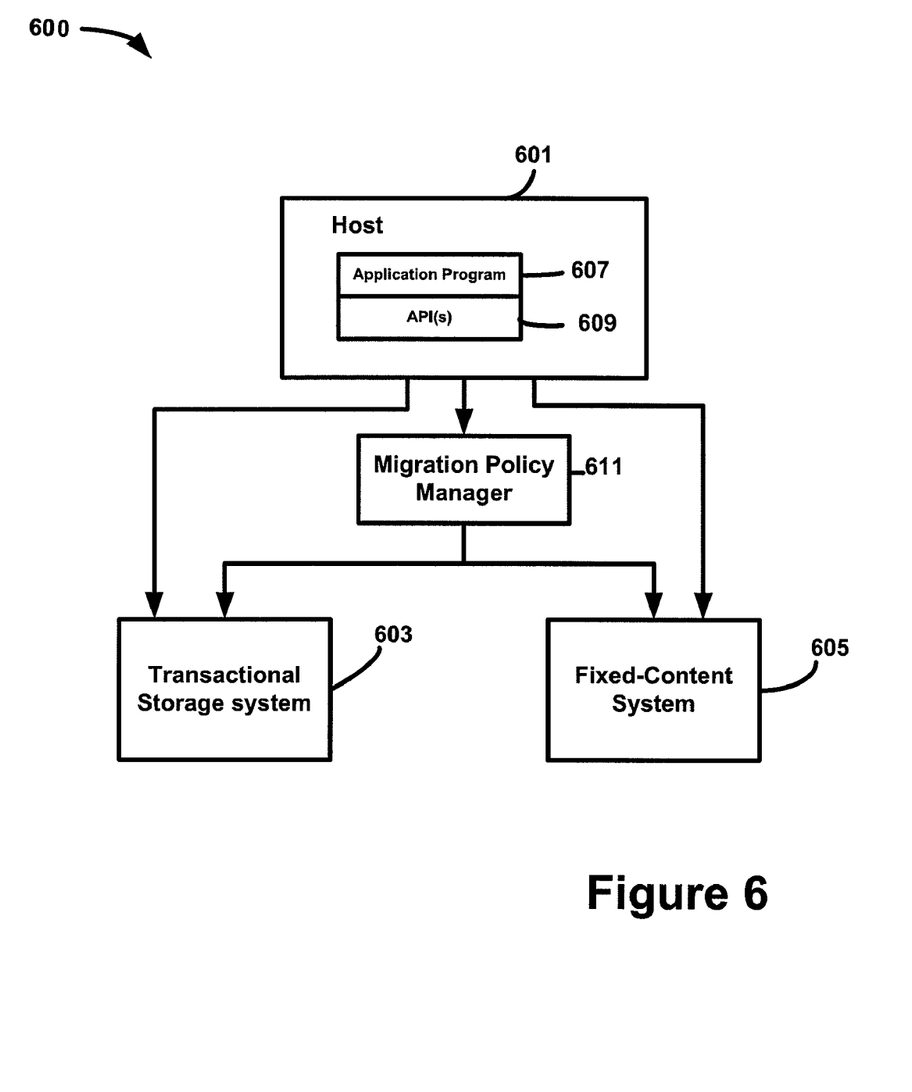
FIG. 6 is a block diagram of an illustrative system in which a migration policy manager controls migration of content between a transactional storage system and a fixed content storage system, in accordance with some embodiments.

One illustrative implementation is shown in FIG. 6, a computer system 600 may include a host computer 601 that executes an application program 607, a transactional storage system 603, and a fixed-content archive storage system 605. The computer system 600 may also include a migration policy manager 611 that controls migration of content between transactional storage system 603 and fixed-content storage system 605. Application program 607 may communicate with transactional storage system 603, fixed content storage system 605, and/or migration policy manager 611 via one or more application programming interfaces (APIs) 609.

Transactional storage system 603 may be any suitable type of non-archive storage system, as the invention is not limited in this respect. For example, transactional storage system 603 may be one or more file servers or network attached storage (NAS) devices, a database management system (DBMS), a block I/O storage system, or any other suitable type of transactional storage system.

Fixed content storage system 605 may be any suitable type of fixed content storage system, as the invention is not limited in this respect. For example, in some embodiments, fixed content storage system 605 may be a content addressable storage system. In some embodiments, the fixed content storage system may be implemented as in any of the embodiments described above (e.g., to implement XAM, a CDF/blob architecture, and/or versioning), but the aspects of the invention that relate to migration are not limited to use with a fixed content storage system of any of those types.

Migration policy manager 611 may control migration of content between transactional storage system 603 and fixed content storage system 605 based on whether portions of the content participate in the generation of an identifier for the content (i.e., are binding) or do not participate in the generation of an identifier for the content (i.e., are not binding). This may be done in any suitable way, as the invention is not limited in this respect.

Figure 7:
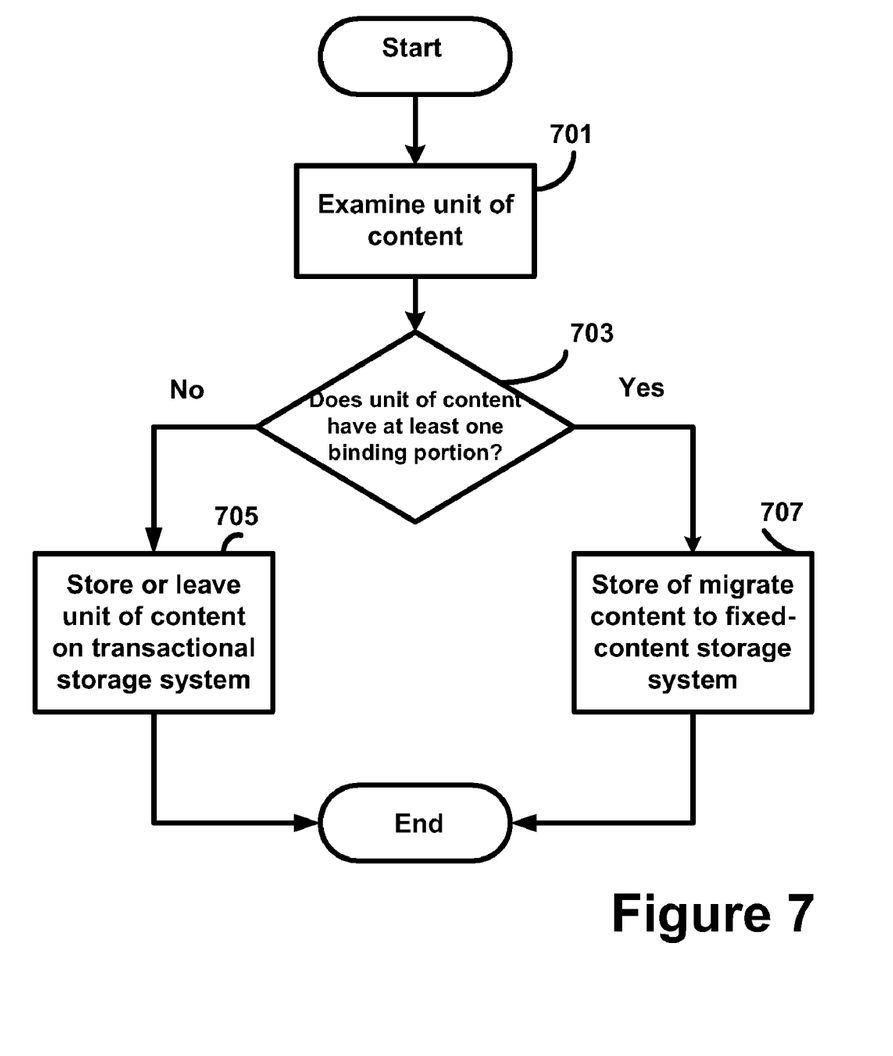
FIG. 7 is a flow chart of an illustrative process for determining whether to store a unit of content on a transactional storage system or a fixed content storage system, in accordance with some embodiments.

FIG. 7 shows an illustrative process that migration policy manager 611 may use, in some embodiments, to select either transactional storage system 603 or fixed-content storage system 605 to store a unit of content, such as, for example, a XAM XSet or other content unit. The process begins at act 701, where the unit of content (e.g., an XSet) that is a candidate for being initially stored or migrated is examined. In this respect, the policy may be applied when a content unit is initially stored in the computer system, or may be applied at any time thereafter to determine whether to migrate previously stored content from one type of storage system to another. When done to migrate previously stored content, any suitable trigger for performing the process may be employed, examples of which are discussed below.

The process then continues to act 703, where it is determined whether at least one portion of the selected unit of content is binding. For example, if the unit of content is a XAM XSet, it may be determined whether at least one field or stream is binding. If, at act 703, it is determined that no fields or streams are binding, the process continues to act 705, where the unit of content is stored on the transactional storage system in act 705. Alternatively, if the unit of content is already stored on the transactional storage, the unit of content may be left on the transactional storage system.

If, at act 703, it is determined that at least one field or stream is binding, the process continues to act 707, where the unit of content is stored on the fixed content storage system or, if the unit of content is stored on the transactional storage system, migrated from the transactional storage system to the fixed content storage. In some embodiments, when a unit of content is migrated from the transactional storage system to the fixed content storage system, the unit of content may be deleted from the transactional storage system (though it is not required to be).

As mentioned above, the migration policy manager may examine a unit of content in response to any suitable trigger, as the invention is not limited in this respect. For example, in some embodiments, the unit of content may be examined in response to an application program sending a request to initially store the content unit to the storage environment. In some embodiments, the migration policy manager may select a unit of content in response to the application program sending a request to alter designation of one or more portions of the unit of content from non-binding to binding, or vice versa. In some embodiments, the migration policy manager may periodically scan units of content stored on the transactional storage system (e.g., as a background process) and select units of content to be examined in this way. Any other suitable way of triggering the process to examine a content unit may be used.

In the example of FIG. 7, at act 703, the migration policy manager makes a determination that will impact where to store and/or whether to migrate a content unit based on whether at least one portion of the content unit is binding. However, this is only one example of a criterion or criteria that the migration policy manager may use to determine where to store and/or whether to migrate a content unit, as any suitable criterion or criteria may be used, and aspects of the invention related to determining where to store or migrate a content unit are not limited in this respect. For example, in some embodiments, migration policy manager may initially store a unit of content on the fixed content storage system or migrate a unit of content from the transactional storage system to the fixed content storage system only if all of the content of the unit of content is binding, or if the amount of content of the content unit that is binding exceeds a certain threshold (e.g., in terms of size and/or percentage of the overall content of the content unit).

In some embodiments, the migration policy manager may migrate a unit of content from the transactional storage system to the fixed content storage system based on an amount of time that the unit of content has been stored on the transactional storage system. For example, in some embodiments, if the amount of time that a unit of content that has been stored on the transactional storage system exceeds a certain threshold, the migration policy manager may migrate the content unit to the fixed content storage system. In some such embodiments, a unit of content may be migrated regardless of whether any of the content of the unit of content is binding, or may be migrated only if some or all of the content is binding. As should be clear from the examples above, any suitable criterion or criteria may be used to select either the transactional storage system or fixed content storage system as the initial storage location for a unit of content and/or to determine whether to migrate a unit of content stored on the transactional storage system to the fixed content storage system.

For example, a portion of a logical object (i.e., a content unit) that is stored on a transactional storage system may be designated as non-binding and may be periodically modified by a user (e.g., using an application program). When the user is done modifying the portion of the logical object, the user may (e.g., via the application program) alter the designation of all of the non-binding fields and/or streams to binding.

In response to the user setting these fields and/or streams to binding, the migration policy manager may cause the logical object to be migrated from the transactional storage system to the fixed content storage system.

In some embodiments, the criterion or criteria used by the migration policy manager may be user configurable, such that a user and/or system administrator may configure the system to specify under what circumstances a unit of content is stored on and/or migrated to the transactional storage system and under what circumstance the unit of content is stored on and/or migrated to the fixed content storage system.

Figure 8:
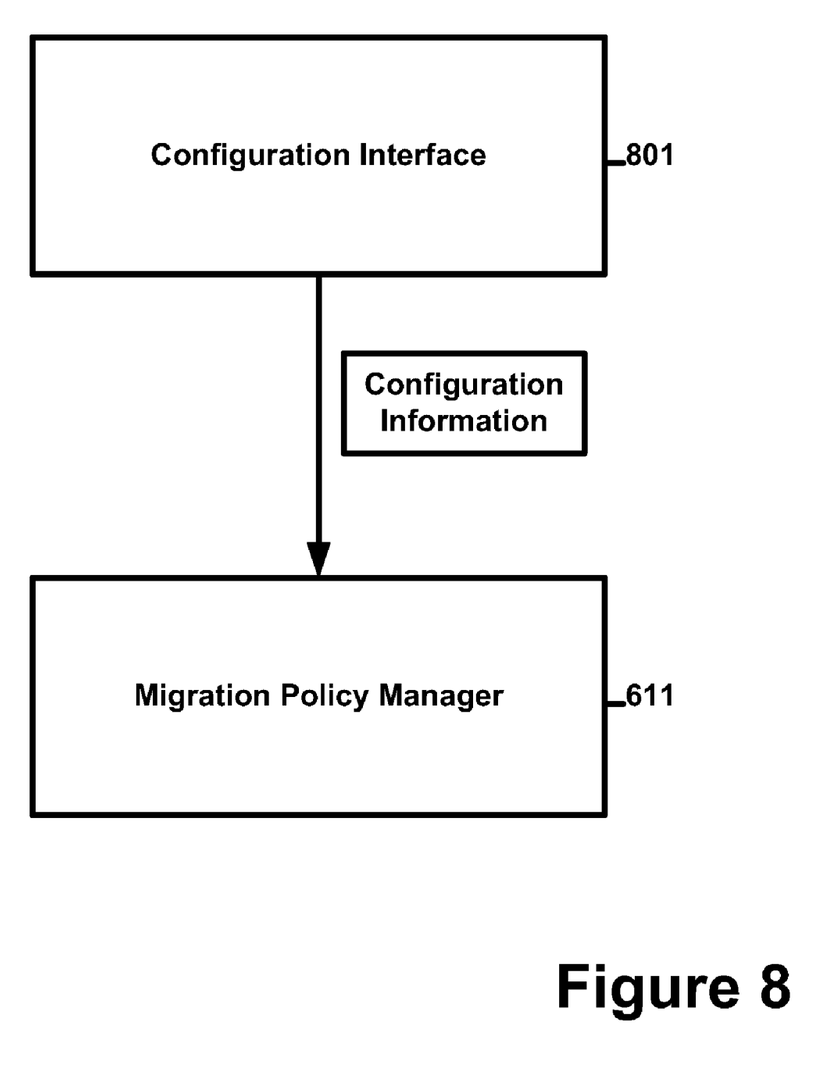
FIG. 8 is a block diagram of configuration interface for a migration policy manager, in accordance with some embodiments.

For example as shown in FIG. 8, migration policy manager 611 may have a configuration interface 801 by which a user and/or system administrator may send configuration information to configure the migration policy implemented by the migration policy manager. The configuration interface 801 may be used to periodically change the configuration of the migration policy.

Any suitable aspects of the migration policy may be configured. For example, any of the aspects of migration policy discussed above in connection with FIG. 7 may be configured (e.g., under what circumstances a unit of content is stored on a particular storage system and/or migrated to a particular storage system). In addition, configuration interface 801 may be used, for example, to configure which storage system serves as the transactional storage system and which storage system serves as the fixed-content storage system. In some embodiments, migration policy manager may be configured (e.g., via the configuration interface) to apply different migration policies to different content units based on one or more characteristics of the content unit. The policy applied to a particular content unit may be based on any suitable characteristic of the content unit, such as, for example, the source of the content unit (e.g., the application program or host computer that initially stored the content unit in the storage environment), the size of the content unit, the time of storage of the content unit, or any other suitable characteristic.

In the example of FIG. 6, migration policy manager 611 is depicted as a box between host computer 601 and storage systems 603 and 605. However, migration policy manager 611 may be implemented on any suitable system or combination of systems in computer system 600. For example, migration policy manager 611 may be implemented on host computer 601, transactional storage system 603, fixed content storage system 605, an appliance coupled in between host computer 601 and storage systems 603 and 605, such as a NAS aggregator, via which access requests from host computer 601 are route to storage systems 603 and 605, and/or any combination thereof. In some embodiments, when migration policy manager 611 is implemented entirely or in part in host computer 601, the migration policy manager 611 may implemented in the API(s) 609 (e.g., as a vendor interface module) that the application program 607 uses to communicate with storage systems 603 and 605.

It should be appreciated that the above-described embodiments for creating versions of non-binding content on a fixed-content storage system and the above-described embodiments for configuring a migration policy and controlling migration of content between a transactional storage system and fixed-content storage system may be used separately or may be used together in any suitable way.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer storage environment comprising a transactional storage system and a fixed content storage system, wherein the storage environment stores a plurality of content units and provides a content addressable interface via which at least some of the plurality of content units are accessible, wherein a content unit accessible via the content addressable interface is accessible via an identifier that comprises a content address generated based, at least in part, on at least a participating portion of content of the content unit, the method comprising an act of:

(A) providing an interface to the storage environment that enables configuration of at least one migration policy that controls migration of sets of data between the transactional storage system and the fixed content storage system based on at least one criteria relating to whether a set of data in the content unit is participating in the generation of the content address for the content unit.

2. The method of claim 1, wherein the act (A) comprises providing the interface to the storage environment that enables configuration of the at least one migration policy that controls migration of the set of data in the content unit from the transactional storage system to the fixed content storage system in response to the set of data transitioning from not participating in the generation of the content address for the content unit to participating in the generation of the content address for the content unit.

3. The method of claim 1, wherein the act (A) comprises providing the interface to the storage environment that enables configuration of the at least one migration policy that controls migration of the set of data in the content unit from the fixed content storage system to the transactional storage system in response to the set of data transitioning from participating in the generation of the content address for the content unit to not participating in the generation of the content address for the content unit.

4. The method of claim 1, wherein the act (A) comprises providing the interface to the storage environment that enables configuration of the at least one migration policy that controls migration of the set of data in the content unit from the fixed content storage system to the transactional storage system in response to the set of data being modified.

5. The method of claim 1, wherein the act (A) comprises providing the interface to the storage environment that enables configuration of the at least one migration policy that controls migration of the set of data in the content unit from the transactional storage system to the fixed content storage system in response to the first set of data transitioning from not participating in the generation of the content address for the content unit to participating in the generation of the content address for the content unit and that maintains a second set of data in the content unit that does not participate in the generation of the content address on the transactional storage system.

6. The method of claim 1, wherein the act (A) comprises providing the interface to the storage environment that enables configuration of the at least one migration policy that controls migration of the set of data in the content unit from the transactional storage system to the fixed content storage system in response to a last of the set of data transitioning from not participating in the generation of the content address for the content unit to participating in the generation of the content address for the content unit.

7. The method of claim 6, wherein the last of the set of data transitioning from not participating in the generation of the content address for the content unit to participating in the generation of the content address for the content unit is the last of the data in the content unit to transition from not participating in the generation of the content address for the content unit to participating in the generation of the content address for the content unit.

8. The method of claim 6, wherein the last of the set of data transitioning from not participating in the generation of the content address for the content unit to participating in the generation of the content address for the content unit results in the participating portion of the content unit comprising a percentage of the content unit that exceeds a threshold.

9. At least one computer readable medium encoded with instructions that, when executed, perform a method for use in a computer storage environment comprising a transactional storage system and a fixed content storage system, wherein the storage environment stores a plurality of content units and provides a content addressable interface via which at least some of the plurality of content units are accessible, wherein a content unit accessible via the content addressable interface is accessible via an identifier that comprises a content address generated based, at least in part, on at least a participating portion of content of the content unit, the method comprising an act of:

(A) providing an interface to the storage environment that enables configuration of at least one migration policy that controls migration of sets of data between the transactional storage system and the fixed content storage system based on at least one criteria relating to whether a set of data in the content unit is participating in the generation of the content address for the content unit.

10. The at least one computer readable medium of claim 9, wherein the act (A) comprises providing the interface to the storage environment that enables configuration of the at least one migration policy that controls migration of the set of data in the content unit from the transactional storage system to the fixed content storage system in response to the set of data transitioning from not participating in the generation of the content address for the content unit to participating in the generation of the content address for the content unit.

11. The at least one computer readable medium of claim 9, wherein the act (A) comprises providing the interface to the storage environment that enables configuration of the at least one migration policy that controls migration of the set of data in the content unit from the fixed content storage system to the transactional storage system in response to the set of data transitioning from participating in the generation of the content address for the content unit to not participating in the generation of the content address for the content unit.

12. The at least one computer readable medium of claim 9, wherein the act (A) comprises providing the interface to the storage environment that enables configuration of the at least one migration policy that controls migration of the set of data in the content unit from the fixed content storage system to the transactional storage system in response to the set of data being modified.

13. The at least one computer readable medium of claim 9, wherein the act (A) comprises providing the interface to the storage environment that enables configuration of the at least one migration policy that controls migration of the set of data in the content unit from the transactional storage system to the fixed content storage system in response to the first set of data transitioning from not participating in the generation of the content address for the content unit to participating in the generation of the content address for the content unit and that maintains a second set of data in the content unit that does not participate in the generation of the content address on the transactional storage system.

14. The at least one computer readable medium of claim 9, wherein the act (A) comprises providing the interface to the storage environment that enables configuration of the at least one migration policy that controls migration of the set of data in the content unit from the transactional storage system to the fixed content storage system in response to a last of the set of data transitioning from not participating in the generation of the content address for the content unit to participating in the generation of the content address for the content unit.

15. A computer storage environment comprising:
a transactional storage system;
a fixed content storage system;
a storage device that stores a plurality of content units;
a first content addressable interface via which at least some of the plurality of content units are accessible, wherein a content unit accessible via the first content addressable interface is accessible via an identifier that comprises a content address generated based, at least in part, on at least a participating portion of the content of the content unit; and
a second interface that enables configuration of at least one migration policy that controls migration of sets of data between the transactional storage system and the fixed content storage system based on at least one criteria relating to whether a set of data in the content unit is participating in the generation of the content address for the content unit.

16. The computer storage environment of claim 15, wherein the second interface is an interface that enables configuration of the at least one migration policy that controls migration of the set of data in the content unit from the transactional storage system to the fixed content storage system in response to the set of data transitioning from not participating in the generation of the content address for the content unit to participating in the generation of the content address for the content unit.

17. The computer storage environment of claim 15, wherein the second interface is an interface to the storage environment that enables the at least one migration policy that controls migration of the set of data in the content unit from the fixed content storage system to the transactional storage system in response to the set of data transitioning from participating in the generation of the content address for the content unit to not participating in the generation of the content address for the content unit.

18. The computer storage environment of claim 15, wherein the second interface is an interface to the storage environment that enables the at least one migration policy that controls migration of the set of data in the content unit from the fixed content storage system to the transactional storage system in response to the set of data being modified.

19. The computer storage environment of claim 15, wherein the second interface is an interface to the storage environment that enables the at least one migration policy that controls migration of the set of data in the content unit from the transactional storage system to the fixed content storage system in response to the first set of data transitioning from not participating in the generation of the content address for the content unit to participating in the generation of the content address for the content unit and that maintains a second set of data in the content unit that does not participate in the generation of the content address on the transactional storage system.

20. The computer storage environment of claim 15, wherein the second interface is an interface to the storage environment that enables the at least one migration policy that controls migration of the set of data in the content unit from the transactional storage system to the fixed content storage system in response to a last of the set of data transitioning from not participating in the generation of the content address for the content unit to participating in the generation of the content address for the content unit.

* * * * *